(12) United States Patent
Wolter

(10) Patent No.: US 10,894,936 B2
(45) Date of Patent: Jan. 19, 2021

(54) INDIRECT WATER HEATING AND CHILLING SYSTEM FOR BREWING BEER

(71) Applicant: PrecisionTemp, Inc., Cincinnati, OH (US)

(72) Inventor: Gerry C. Wolter, Cincinnati, OH (US)

(73) Assignee: PrecisionTemp, Inc., Cincinnati, OH (US)

( * ) Notice: Subject to any disclaimer, the term of this patent is extended or adjusted under 35 U.S.C. 154(b) by 584 days.

(21) Appl. No.: 15/481,712

(22) Filed: Apr. 7, 2017

(65) Prior Publication Data

US 2017/0292099 A1 Oct. 12, 2017

Related U.S. Application Data

(60) Provisional application No. 62/319,442, filed on Apr. 7, 2016.

(51) Int. Cl.
*C12C 7/22* (2006.01)
*C12C 7/20* (2006.01)
*C12C 7/26* (2006.01)
*C12C 13/02* (2006.01)

(52) U.S. Cl.
CPC ............ *C12C 7/20* (2013.01); *C12C 7/26* (2013.01); *C12C 7/22* (2013.01); *C12C 13/02* (2013.01)

(58) Field of Classification Search
CPC ............ C12C 7/20; C12C 7/22; C12C 7/26
USPC ............ 99/278, 276, 277.1, 277.2, 282
See application file for complete search history.

(56) References Cited

U.S. PATENT DOCUMENTS

| | | | | |
|---|---|---|---|---|
| 5,320,163 | A * | 6/1994 | Stoodley | A01J 9/04 165/132 |
| RE37,745 | E * | 6/2002 | Brandt | F24H 1/205 122/14.2 |
| 9,228,163 | B1 * | 1/2016 | Mitchell | C12C 13/10 |
| 2004/0031392 | A1 * | 2/2004 | Belkin | C12C 11/003 99/275 |
| 2008/0149317 | A1 * | 6/2008 | Baker | F28D 7/022 165/163 |
| 2009/0148556 | A1 * | 6/2009 | Stippler | C12C 13/00 426/16 |
| 2013/0000863 | A1 * | 1/2013 | Kammerloher | C12C 7/067 165/48.1 |
| 2013/0340624 | A1 * | 12/2013 | Webber | C12C 11/00 99/276 |
| 2015/0376557 | A1 * | 12/2015 | Welledits | C12C 7/06 426/64 |
| 2018/0128514 | A1 * | 5/2018 | Knoeppel | F24H 9/2035 |

* cited by examiner

*Primary Examiner* — Lorne E Meade
*Assistant Examiner* — Ayub A Maye
(74) *Attorney, Agent, or Firm* — Frost Brown Todd LLC

(57) ABSTRACT

A system for brewing beer in small batches comprises a first heat exchanger and a second heat exchanger. The first heat exchanger delivers heated fluid into the second heat exchanger. A fluid-in line delivers cool fluid into the second heat exchanger. The second heat exchanger is configured to indirectly chill or heat brewing ingredients in a vessel.

18 Claims, 5 Drawing Sheets

INDIRECT WATER HEATING AND CHILLING SYSTEM FOR BREWING BEER

PRIORITY

This application claims priority to U.S. Provisional Patent Application Ser. No. 62/319,442, filed on Apr. 7, 2016, and entitled, "Indirect Water Heating System for Brewing Beer," the disclosure of which is incorporated herein.

TECHNICAL FIELD

The present disclosure is directed to systems that may be utilized to brew beer on a small scale. The systems comprise heat exchangers that may be used to indirectly heat and indirectly chill brewing ingredients in a vessel. The present disclosure is further directed to methods of brewing beer utilizing the systems.

BACKGROUND

A major part of the process of brewing beer is the heating of water and solutions. In small beer brewing applications (e.g., micro brewing, nano brewing, home brewing, etc.), the most common method to heat water and solutions is to use a pot placed over an open burner, such as a "banjo" burner used for canning fruits and vegetables or a conventional cook top. However, using an open burner has several disadvantages. The open burner is limited in size, due to heat and flue gasses escaping into the environment. Therefore, if a larger burner is used, the brewing must be done outside, which may be undesirable in inclement weather. Additionally, the heat exchange from an open burner to the desired heated water/solution may be about 40%, as unused heat may dissipate into the workspace. As a result, more fuel and more time may be required. The use of an open burner may provide imprecise temperature control, leading to an operator manually adjusting flame in an attempt to maintain or reach a desired temperature.

In some beer brewing processes, a boiling pot of liquid must be removed from the burner for chilling or a "cold break," which might be difficult and unsafe for some operators. Because heat from an open burner stems from the bottom of a heating vessel, ingredients can scorch from fire being directly applied to the bottom of the heating vessel, compromising the final product. Additionally, the time to reach a desired temperature and the marginal temperature control may increase work time and impact results.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

Figure 1:
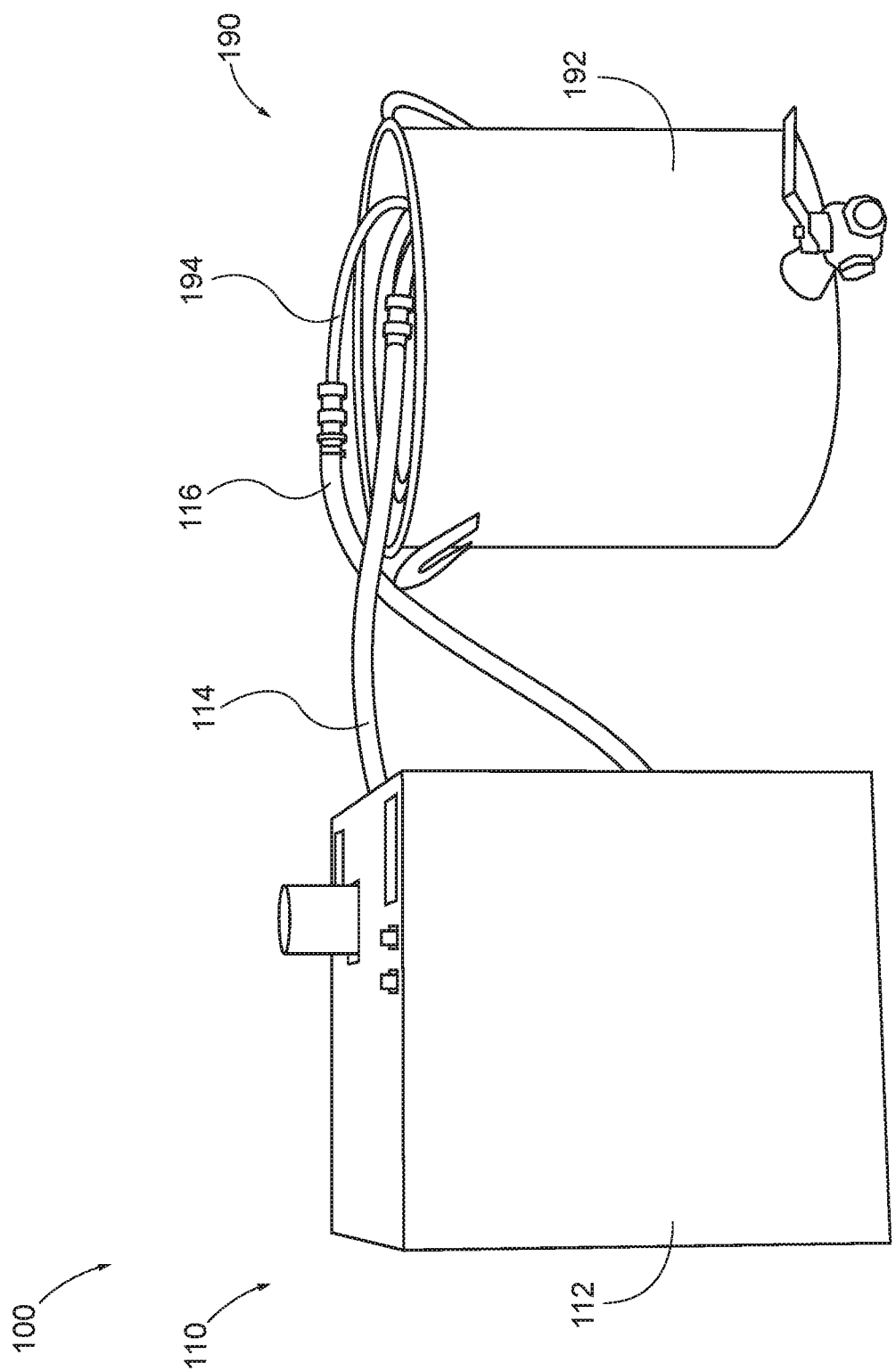
FIG. 1 depicts a perspective view of a brew heating system.

The drawings are not intended to be limiting in any way, and it is contemplated that various embodiments of the invention may be carried out in a variety of other ways, including those not necessarily depicted in the drawings. The accompanying drawings incorporated in and forming a part of the specification, illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Exemplary Home Brew Heating System

Figure 2:
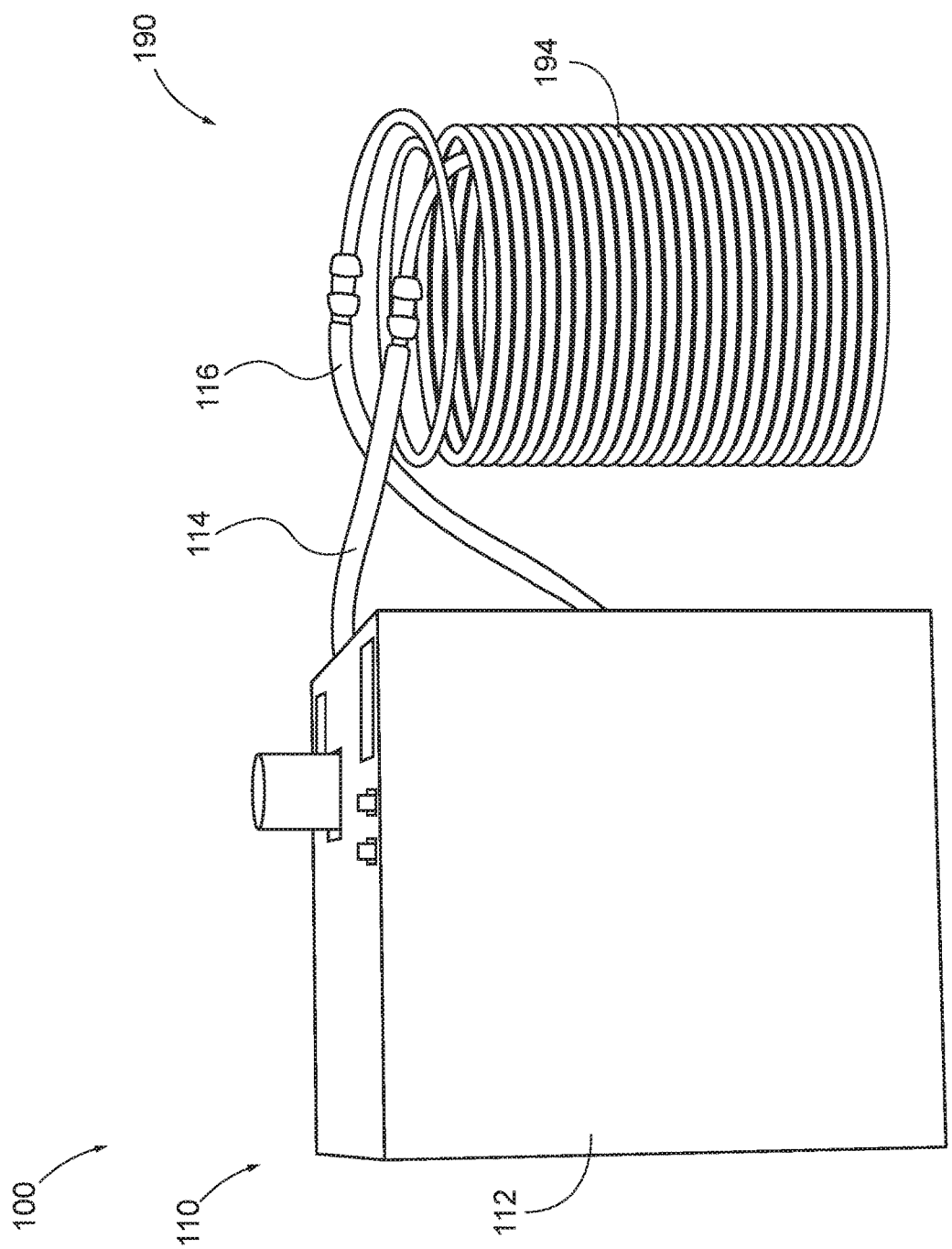
FIG. 2 depicts a perspective view of the brew heating system of FIG. 1 without a heating vessel.

FIGS. 1-2 show an exemplary home brew heating system (100) that may be utilized to in order to brew beer. Brew heating system (100) includes a thermal control unit (110) and a heated vessel assembly (190). Heated vessel assembly (190) includes a vessel (192), and a second heat exchanger (194). As can be seen between FIGS. 1-2, second heat exchanger (194) may be removably stored within the confines of vessel (192). Therefore, second heat exchanger (194) may be removed from vessel (192) so that vessel (192) may be filled with the desired brewing ingredients. "Brewing ingredients" is used interchangeably herein to mean water or solutions. Exemplary solutions may comprise water, hops, yeast, malt, sugar, flavoring, spice, salts, finings and combinations thereof. Since the brewing process requires the equipment to be clean to avoid any cross-contamination of batches or ingredients, removing second heat exchanger (194) may also facilitate more convenient and thorough cleaning of the equipment. Additionally, second heat exchanger (194) is in fluid communication with thermal control unit (110) via a feed hose (114) and a return hose (116). Second heat exchanger (194) coils from the top of vessel (192) to the bottom of vessel (192) so that liquid traveling through second heat exchanger (194) may transfer thermal energy to brewing ingredients from the bottom of vessel (192) to the top of vessel (192). Of course, second heat exchanger (194) may alternatively coil in any suitable direction as would be apparent to one having ordinary skill in the art in view of the teachings herein. For example, second heat exchanger (194) may coil from the bottom of vessel (192) to the top of vessel (192). As will be described in greater detail below, thermal control unit (110) is configured to heat a liquid, such as water, transferring the heated liquid to second heat exchanger (194) via feed hose (114), indirectly heating the brewing ingredients stored in vessel (192) via heated liquid traveling through second heat exchanger (194), and returning liquid from second heat exchanger (194) to thermal control unit (110) via return hose (116). Additionally, thermal control unit is configured to transfer liquid directly from a liquid source through second heat exchanger (194) via return hose (116) in order to chill (i.e., cool) the brewing ingredients stored in vessel (192); this may be achieved by counter flowing the fluid through second heat exchanger (194), so that the chilling water is brought in from the top of the coil so that the cooling can be convected downward, unlike in the heating process where the heating fluid is brought in from the bottom of heat exchanger (194), permitting the upward convention of the transferred heat.

Figure 3:
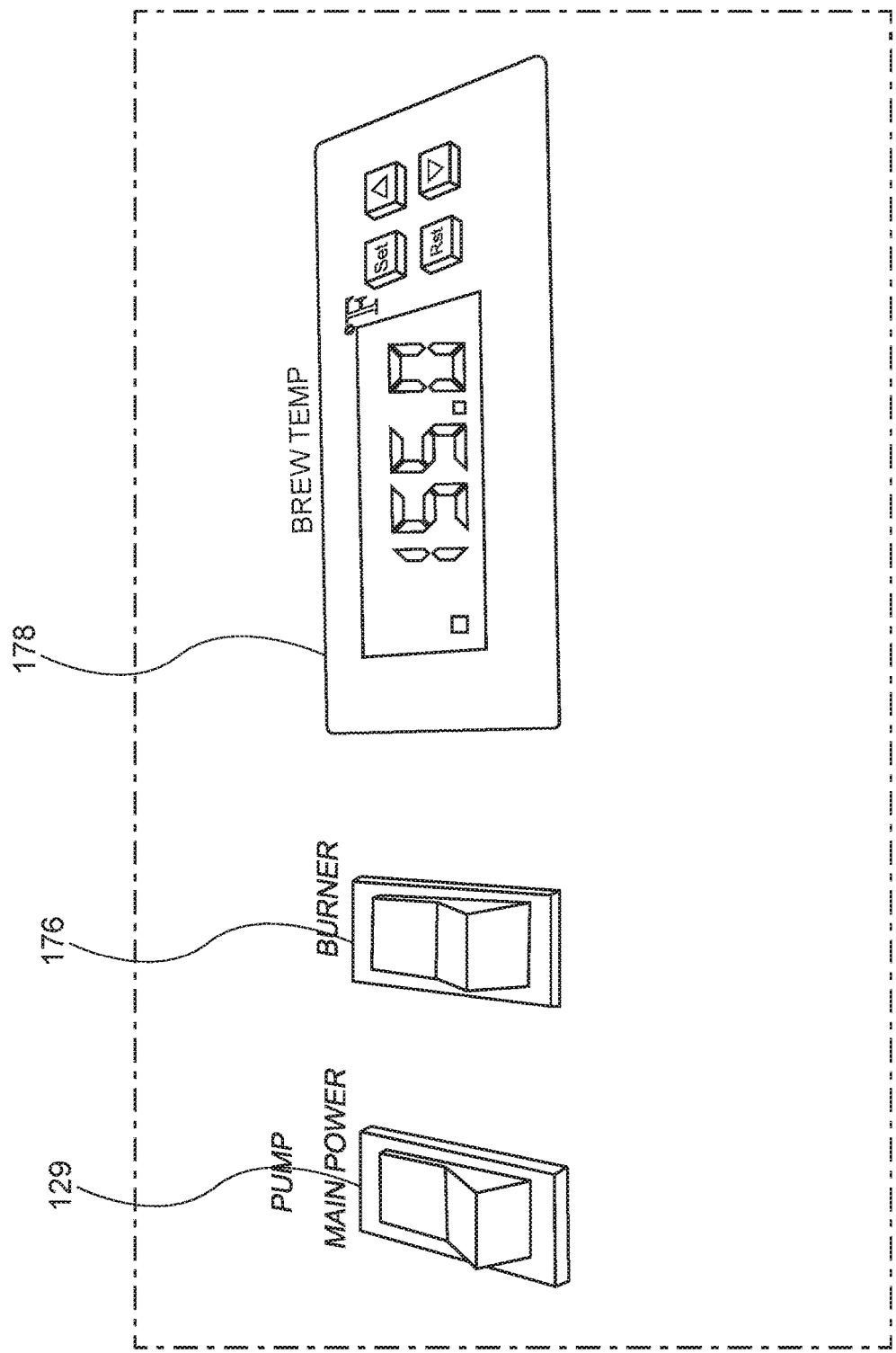
FIG. 3. depicts a perspective view of a casing of the brew heating system of FIG. 1 having various user controls and switches.

Thermal control unit (110) includes a casing (112) that houses the other components of thermal control unit (110). As can be seen in FIG. 3, casing (112) houses a power switch (129), a burner switch (176), and a heated vessel thermostat (178). As will be described in greater detail below, power switch (129) may activate a pump (128) in order to circulate liquid within fluid loop (150); burner switch (176) activates a burner control assembly (160); and heated vessel thermostat (178) allows a user to control the temperature of brewing ingredients stored in vessel (192).

Figure 4:
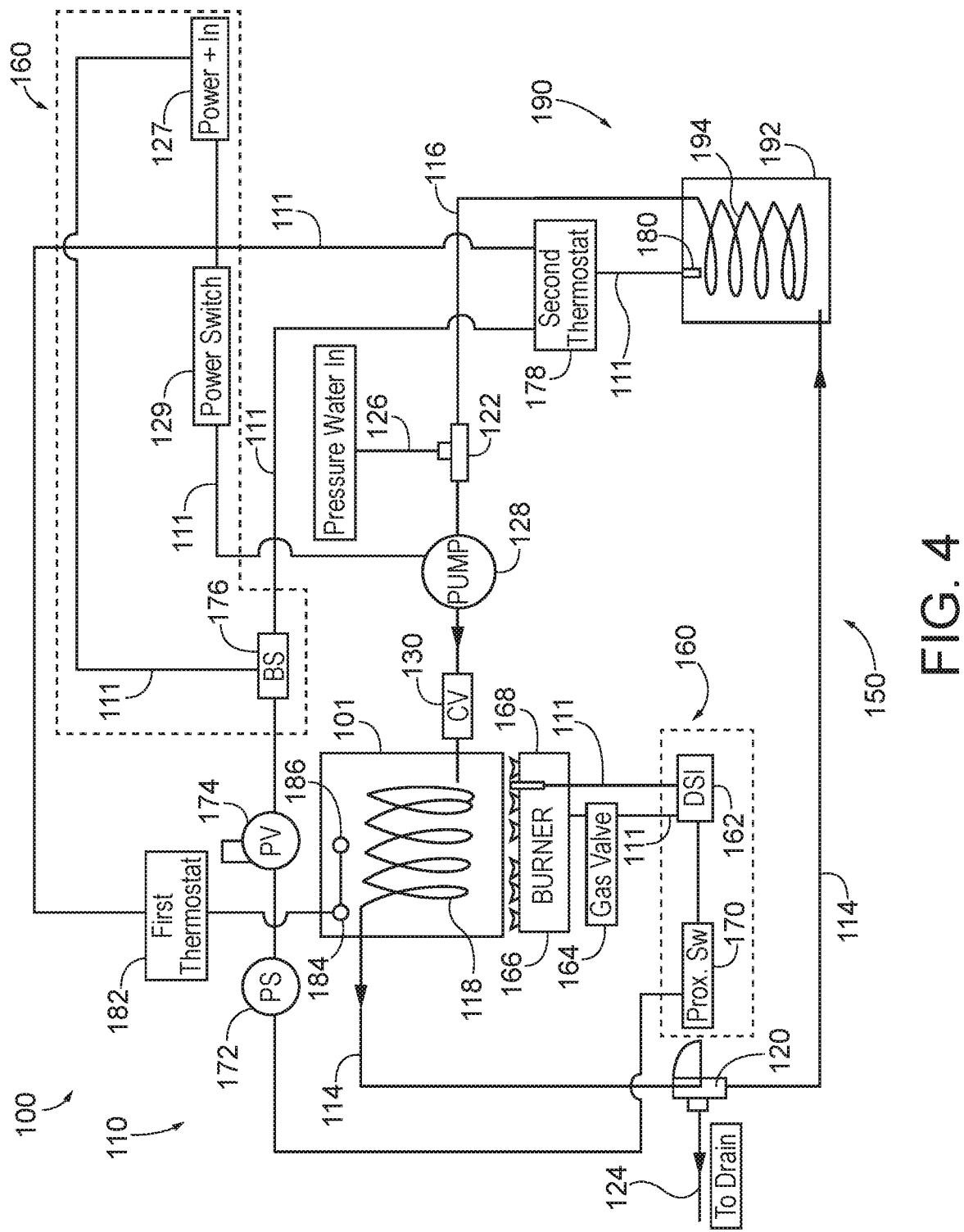
FIG. 4 depicts a schematic view of the brew heating system of FIG. 1.
Figure 5:
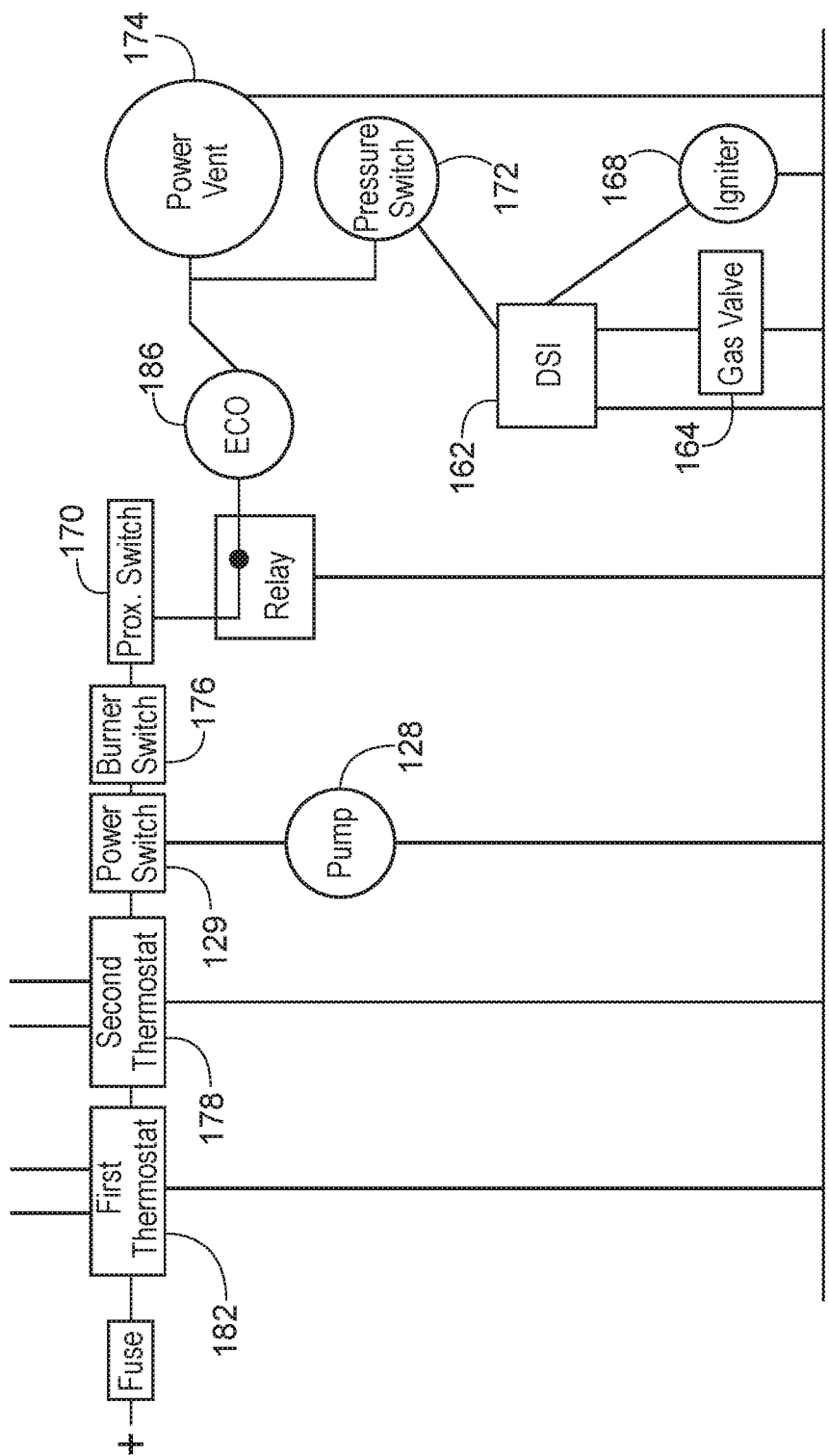
FIG. 5 depicts a schematic view of the electrical wiring of the brew heating system of FIG. 1.

FIG. 4 shows a schematic diagram of home brew heating system (100) without casing (112) for purposes of clarity, while FIG. 5 shows a wiring diagram for the corresponding schematic diagram. As shown in FIG. 4, thermal control unit (110) includes fluid loop (150) and burner control assembly (160). Burner control assembly (160) is configured to heat liquid traveling within fluid loop (150). Fluid loop (150) includes a first heat exchanger (118) in communication with both feed hose (114) and return hose (116) on opposite ends, a three-way valve (120) in fluid communication with feed hose (114) and a fluid-out line (124), second heat exchanger (194) in fluid communication with feed hose (114) and return hose (116) on opposite ends, a tee fitting (122) in fluid communication with return hose (116) and a pressurized liquid-in (126), a pump (128) in fluid communication with return hose (116), and a check valve (130) in fluid communication with return hose (116).

Three-way valve (120) is configured to direct fluid within fluid loop (150) when three-way valve (120) is in a first position, or providing a path for fluid to escape fluid loop (150) via fluid-out line (124) when three-way valve (120) is in a second position. Therefore, a user may bleed heated fluid loop (150) of undesired fluids, such as air, when three-way valve (120) is in the second position. A device, for example, a handle, capable of transitioning three-way valve (120) from the first position to the second position contains a magnet. As will be described in greater detail below, the magnet is positioned such that burner control assembly (160) only activates when three-way valve (120) is in the first position. In other words, burner control assembly (160) is only configured to be activated when fluid loop (150) is closed. Of course, while the current example contemplates use of a handle containing a magnet, any other suitable device for transitioning three-way valve (120) from the first position to the second position while simultaneously determining whether burner control assembly (160) is activated may be used as would be apparent to one having ordinary skill in the art in view of the teachings herein.

Liquid-in (126) is configured to feed a source of pressurized liquid, such as water, into fluid loop (150). Tee fitting, (122) is configured to allow fluid-in line (126) to feed pressurized liquid into fluid loop (150). Therefore, fluid loop (150) may maintain a line pressure of about 40 to about 100 PSI by connecting fluid loop (150) to fluid—in line (126). Pump (128) is configured to pump liquid within fluid loop (150) to travel towards check valve (130), so that the liquid travels in a counter-clockwise path as shown in FIG. 4. Check valve (130) allows liquid to travel from pump (128) towards first heat exchanger (118). However, check valve (130) prevents liquid from traveling from first heat exchanger (118) towards pump (128).

First heat exchanger (118) is located adjacent to a burner (166). First heat exchanger is coiled such that when burner (166) and pump (128) are activated, liquid travels through first heat exchanger (118) for an amount of time sufficient to heat liquid to a desired temperature. Similarly, second heat exchanger (194) is coiled within vessel (192) such that as pump (128) forces liquid through heated fluid loop (150), liquid traveling through second heat exchanger (194) is sufficiently exposed to brewing ingredients in vessel (194) to indirectly transfer thermal energy from heated liquid to brewing ingredients.

Burner control assembly (160) comprises proximal switch (170) and direct spark ignition (162) in electrical communication with each other via wires (111), and further in electrical communication with power source (127) which is in electrical communication with power switch (129) and burner switch (176) via wires (111). As mentioned above, power switch (129) may activate pump (128). Burner switch (176) is in electrical communication with heated vessel thermostat (178). Heated vessel thermostat (178) is connected to a second thermometer (180), which provides a temperature reading associated with brewing ingredients in vessel (192). Heated vessel thermostat (178) is also in electrical communication with first heat exchanger thermostat (182). First heat exchanger thermostat (182) is in electrical communication with first thermometer (184) and emergency cut off switch (186). First thermometer (184) is located to read the temperature of first heat exchanger (118) while emergency cut off switch (186) is designed to shut off burner control assembly (160) if the temperature read by first thermometer (184) is above a predetermined value. As will be described in greater detail below, first thermostat (182) and/or heated vessel thermostat (178) utilize temperatures read by first thermometer (184) and second thermometer (180) in order to activate or deactivate burner (166) to control the temperature of the heated liquid traveling within fluid loop (150).

Burner switch (176) is also in electrical communication with power vent (174), proofing switch (172), proximal switch (170), direct spark ignition (162), and gas valve (164). Power vent (174) is located near first heat exchanger (118) such that power vent (174) is configured to extract unwanted fuel byproduct from the flue hood (101). Proofing switch (172) is located to measure the vacuum within the flue hood (101). "Proofing switch" is used herein to interchangeably mean any suitable means of proofing fluing including, but not limited to, using pressure switches or sail switches.

If the vacuum within flue hood (101) rises above a predetermined limit, proofing switch (172) will automatically shut down burner control assembly (160). Proximal switch (170) is located adjacent to three-way valve (120). Proximal switch (170) is configured to selectively provide power to directed spark ignition (162), gas valve (164), and igniter (168). In particular, proximal switch (170) is activated by the location of the magnet inside handle of three-way valve (120). When three-way valve (120) is in the first position corresponding with a closed fluid loop (150), the magnet is located at a position relative to proximal switch (170) such that proximal switch (170) closes and provides power to the rest of burner control assembly (160). However, when three-way valve (120) is in the second position, the magnet is located at a position relative to proximal switch (170) such that proximal switch (170) opens and does not provide power to the rest of burner control assembly (160). In other words, when three-way valve (120) is positioned to bleed fluids away from heated fluid loop (150), burner control assembly (160) is prevented from activating burner (166); when three-way valve (120) is positioned to allow fluids to travel completely within a closed fluid loop (150), burner control assembly (160) is enabled to activate burner (166).

Direct spark ignition (162) is configured to activate igniter (168) and opening gas valve (164). Gas valve (164) is connected to a source of fuel and burner (166). Therefore, when gas valve (164) is opened, a source of fuel is fed to burner (166). Direct spark ignition (162) is also configured to open gas valve (164) to feed burner (166) and activating igniter (168) such that the fuel traveling through burner (166) is lit.

Specifically, direct spark ignition (162) is configured to open gas valve (164) and to activate igniter (168) when proximal switch (170) is activated by three-way switch (120) being in the first position as described above. Direct spark ignition (162) is also configured to close gas valve (164) to effectively shut off burner (166). Similar to when direct spark ignition (162) opens gas valve (164), direct spark ignition (162) may close gas valve (164) in response to signal(s) sent from heated vessel thermostat (178).

Heated vessel thermostat (178) sends the signal to activate or deactivate direct spark ignition (162) based on information received from first heat exchanger thermostat (182), first thermometer (184), and second thermometer (180). In particular, when the temperature reading of second thermometer (180) is below the user defined temperature set on heated vessel thermostat (178), direct spark ignition (162) may be commanded to activate burner (166). When the temperature reading of second thermometer (180) is above the user defined temperature set on heated vessel thermostat (178), direct spark ignition (162) may be commanded to deactivate burner (166).

Additionally, a user may determine a temperature value for first heat exchange thermostat (182) such that heated vessel thermostat (178) will selectively command direct spark ignition (162) to close gas valve (164) if first thermometer (184) reads a temperature above the value set for first heat exchange thermostat (182). This may be helpful in preventing flash boiling. For example, first heat exchange thermostat (182) may be set to about 230 degrees Fahrenheit when liquid-in line (126) has a pressure of about 25 PSI.

It should be understood that emergency cut off switch (186) will shut off entire burner control assembly (60) as if burner switch (176) and power switch (129) had been flipped off. In exemplary embodiments, the pump (128) may continue running in order to chill various components in the brew heating system (100). However, if first thermometer (184) reads a temperature above the value set by first heat exchanger thermostat (182), heated vessel thermostat (178) will just shut off direct spark ignition (162) until first thermometer (184) reads a value below that set on first heat exchanger thermostat (182).

While in the current example, heated vessel thermostat (178) sends signal(s) to selectively activate direct spark ignition (162), it should be understood that signal(s) to activate and deactivate direct spark ignition (162) may be sent by first heat exchanger thermostat (182) or any other suitable equipment known to a person having ordinary skill in the art in view of the teachings herein.

Home brew heating system (100) also has the ability to chill brewing ingredients stored within vessel (192). When chilling of brewing ingredients is desired, a user may switch three-way valve (120) into the second position, thereby allowing fluid to exit fluid loop (150) via fluid-out line (124). Additionally, a user may feed second heat exchanger (194) with cooled liquid from liquid-in line (126). In other words, un-heated liquid would travel from liquid-in line (126), through return hose (116) and second heat exchanger (194) in order to chill brewing ingredients. Afterwards, un-heated liquid would travel through feed hose (114), three-way valve (120) and through fluid-out line (124) to exit fluid loop (150).

Home brew heating system (100) may be substantially more efficient than a traditional home brewing method with an open burner. Digital temperature control of home brew heating system (100) may allow for more precise temperatures with no need to manually adjust flame to hold proper temperature. With home brew heating system (100), vessel (192) does not have to be moved from the burner to cool. The same heat exchanger (194) that heats can be left in vessel (194) to use in the chilling process by operating three-way valve (120). All components of home brew heating system (100) may be powered by a low voltage power supply. Home brew heating system (100) may ensure that the hottest temperature to come into contact with ingredients does not exceed about 230 degrees Fahrenheit, helping ensure brewing ingredients do not scorch. Since fluid loop (150) is under pressure from fluid-in line (126), this allows for heating temperatures up to about 230 degrees Fahrenheit without flash boiling occurring in fluid loop (150), helping potentially speed up the heating process. This may lead to time of brewing to be cut in half. Additionally, constant attention of the user may not be required, allowing the user to move onto other processes of brewing.

II Exemplary Use of Home Brew Heating System

In exemplary use of home brew heating system (100) described above, a user may first turn the three-way valve (120) to the second position in order to bleed air from fluid loop (150) via fluid-out line (124). A user may then turn on power switch (129) and then turn three-way valve (120) to the first position for several seconds. With power switch (129) activated, pump (128) will start to pump fluid through fluid loop (150). A user may then alternate three-way valve (120) from the first position to the second position for several seconds, and then alternate the position of three-way valve (120) until no more air can be expelled via fluid-out line (124).

A user may then turn on burner switch (176). A user may then set first heat exchanger thermostat (182) to a desired value, such as about 230 degrees Fahrenheit. It should be understood the desired value of first heat exchanger thermostat (182) may be lower if pressure from liquid-in line (126) is lower than about 25 PSI. A user may then set heated vessel thermostat (178) to a desired working temperature. If three-way valve (120) is in the first position, proximal switch (170) will complete the circuit of burner control assembly (160) such that burner (166) will be capable of being selectively activated.

If the temperature measured by second thermometer (180) is lower than the value selected on heated vessel thermostat (178) when burner switch (176) is turned on and proximal switch (170) is activated, then burner (166) will be lit by direct spark ignition (162) as described above. With burner (166) lit, power vent (174) may also be activated to expel unwanted fuel byproduct from flue hood (101). Pump (128) circulates heating liquid through check valve (130) to first heat exchanger (118), which is located above burner (166). Liquid is heated while in first heat exchanger (118) and is further pumped through feed hose (114) towards second heat exchanger (194) in order to indirectly heat the brewing ingredients located within vessel (192). Heated vessel thermostat (178) and second thermometer (180) monitor the temperature of the brewing ingredients in vessel (192), and cycles burner (166) to on and off states as necessary to maintain the user selected temperature on heated vessel thermostat (178).

Additionally, if first thermometer (184) measures a value greater than the value set on first heat exchanger thermostat (182), then direct spark ignition (162) will close gas valve (164), therefore turning off burner (166). Additionally, if proofing switch (172) detects a vacuum value less than a predetermined threshold, burner switch (176) will automatically shut off. If first thermometer (184) detects a temperature greater than emergency cut off switch (186), then burner switch (176) will shut off.

If a user decides to chill the brewing ingredients, or rapidly chill down the brewing ingredients, a user may turn off burner switch (176). If vessel (192) has a height that is more than about twice the height of heat exchanger (194), a user may also raise second heat exchanger (194) to the top of vessel (192) to enhance cooling by convection. A user may then turn three-way valve (120) in the second position to provide fluid communication between feed hose (114) and fluid-out line (124). Cool liquid from pressurized liquid-in line (126) will then travel through return hose (116) through second heat exchanger (194) and out of three-way valve (120) into fluid-out line (124), thereby chilling the brewing ingredients within vessel (192). In other words, cool water travels from fluid-in line (126), which is pressurized, through second heat exchanger (194) in order to directly cool the brewing ingredients.

III Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors.

EXAMPLE 1

A home brew heating system comprising a first heat exchanger, a burner, a second heat exchanger, a drain line, a pressurized fluid-in line, a thermometer associated with the second heat exchanger, a vessel configured to removably house the second heat exchanger, and brewing ingredients housed within the vessel, wherein the first heat exchanger is in fluid communication with the second heat exchanger, wherein the burner is configured to activate in response to a preselected temperature measured by the thermometer, wherein the fluid-in line is configured to provide a cooling liquid to the second heat exchanger in order to chill the brewing ingredients housed within the vessel, wherein the cooling liquid is configured to exit via the drain line.

EXAMPLE 2

A method of brewing beer with a home brew heating system comprising a first heat exchanger, a burner, a second heat exchanger, a drain line, a pressurized fluid-in line, a thermometer associated with the second heat exchanger, a vessel configured to removably house the second heat exchanger, and brewing ingredients housed within the vessel, the method comprises turning on the burner in response to a temperature measured by the thermometer, heating a fluid within the first heat exchanger, moving the fluid from the first heat exchanger to the second heat exchanger, indirectly heating the brewing ingredients with the fluid traveling within the second heat exchanger, chilling the brewing ingredients by feeding the second heat exchanger with a cooling liquid provided by the pressurized fluid-in line, wherein the cooling liquid travels from the second heat exchanger to the drain line.

IV Miscellaneous

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A system for brewing beer, the system comprising:
   (a) a first heat exchanger;
   (b) a burner;
   (c) a second heat exchanger;
   (d) a vessel configured to:
      i. contain brewing ingredients; and
      ii. house the second heat exchanger;
   (e) a first thermometer configured to measure a temperature of a liquid in the first heat exchanger;
   (f) a second thermometer configured to measure a temperature of the brewing ingredients;

(g) a fluid loop, the fluid loop comprising the first heat exchanger in fluid communication with the second heat exchanger via a feed hose and the second heat exchanger in fluid communication with the first heat exchanger via a return hose; and
(h) a three-way valve in fluid communication with the feed hose and a drain line, wherein:
1) the burner is configured to:
   a. activate in response to a preselected temperature measured by the second thermometer;
   b. once activated, to heat the liquid in the first heat exchanger; and
2) the first heat exchanger is in fluid communication with the second heat exchanger such that heated liquid may be transferred from the first heat exchanger to the second heat exchanger;
3) the second heat exchanger is configured to indirectly heat the brewing ingredients contained in the vessel, when the heated liquid is inside the second heat exchanger; and
4) the three-way valve is configured to selectively:
   a. close the fluid loop such that the liquid flows from the first heat exchanger to the second heat exchanger via the feed hose and the liquid flows from the second heat exchanger to the first heat exchanger via the return hose, when the three-way valve is in a first position; or
   b. stop the flow of the liquid from the first heat exchanger and the second heat exchanger via the feed hose and to stop the flow of the liquid from the second heat exchanger to the first heat exchanger via the return hose and open a fluid-out line such that the liquid flows from the system via a drain, when the three-way valve is in a second position.

2. The system for brewing beer of claim 1, wherein the vessel is configured to removably house the second heat exchanger.

3. The system for brewing beer of claim 1, further comprising a fluid-in line that is fluidly connected to the second heat exchanger and is configured to deliver cooling liquid to the second heat exchanger.

4. The system for brewing beer of claim 3, wherein the fluid-out line that is fluidly connected to the second heat exchanger and is configured to receive the cooling liquid from the second heat exchanger.

5. The system for brewing beer of claim 4, wherein the burner is further configured to be activated only when the fluid loop is closed.

6. The system for brewing beer of claim 4, further comprising:
(a) a direct spark igniter; and
(b) a gas valve;
wherein the gas valve is configured to open and the direct spark igniter is configured to ignite gas when the three-way switch is in the first position.

7. The system for brewing beer of claim 1, further comprising:
(a) a proofing switch; and
(b) a flue hood;
wherein the proofing switch is configured to deactivate the burner when pressure in the flue hood rises above a predetermined limit.

8. The system for brewing beer of claim 1, further comprising a first thermostat that is configured to activate or deactivate the burner based upon a predetermined temperature read by the first thermometer.

9. The system for brewing beer of claim 8, further comprising a second thermostat that is configured to activate or deactivate the burner based upon a predetermined temperature read by the second thermometer.

10. The system for brewing beer of claim 1, wherein the burner is further configured to de-activate in response to a preselected temperature measured by the second thermometer.

11. A system for brewing beer, the system comprising:
(a) a first heat exchanger;
(b) a burner;
(c) a second heat exchanger;
(d) a vessel configured to:
   i. contain brewing ingredients; and
   ii. removably house the second heat exchanger;
(e) a first thermometer configured to measure a temperature of a liquid in the first heat exchanger;
(f) a second thermometer configured to measure a temperature of the brewing ingredients;
(g) a first thermostat that is configured to activate or deactivate the burner based upon a predetermined temperature read by the first thermometer;
(h) a second thermostat that is configured to activate or deactivate the burner based upon a predetermined temperature read by the second thermometer;
(i) a fluid-in line that is fluidly connected to the second heat exchanger and is configured to deliver the liquid to the second heat exchanger;
(j) a fluid-out line that is fluidly connected to the second heat exchanger and is configured to receive the liquid from the second heat exchanger;
(k) a fluid loop, the fluid loop comprising the first heat exchanger in fluid communication with the second heat exchanger via a feed hose and the second heat exchanger in fluid communication with the first heat exchanger via a return hose; and
(l) a three-way valve in fluid communication with the feed hose and a drain line, wherein the three-way valve is configured to selectively:
   i. close the fluid loop such that the liquid flows from the first heat exchanger to the second heat exchanger via the feed hose and the liquid flows from the second heat exchanger to the first heat exchanger via the return hose, when the three-way valve is in a first position; or
   ii. stop the flow of the liquid from the first heat exchanger and the second heat exchanger via the feed hose and to stop the flow of the liquid from the second heat exchanger to the first heat exchanger via the return hose and open the fluid-out line such that the liquid flows from the system via a drain, when the three-way valve is in a second position;
wherein the second heat exchanger is configured to selectively indirectly heat or indirectly chill the brewing ingredients contained in the vessel.

12. The system for brewing beer of claim 11, wherein the burner is further configured to de-activate in response to a preselected temperature measured by the second thermometer.

13. A system for brewing beer, the system comprising:
(a) a first heat exchanger;
(b) a burner;
(c) a second heat exchanger;
(d) a vessel configured to contain brewing ingredients;
(e) a thermometer configured to measure a temperature of the brewing ingredients;
(f) a proofing switch;

(g) a flue hood;
(h) a drain line;
(i) a fluid loop, the fluid loop comprising the first heat exchanger in fluid communication with the second heat exchanger via a feed hose and the second heat exchanger in fluid communication with the first heat exchanger via a return hose; and
(j) a three-way valve in fluid communication with the feed hose and the drain line;

wherein:
1) the burner is configured to:
   a. activate in response to a preselected temperature measured by the thermometer; and
   b. once activated, to heat a liquid in the first heat exchanger;
2) the first heat exchanger is in fluid communication with the second heat exchanger such that heated liquid may be transferred from the first heat exchanger to the second heat exchanger;
3) the second heat exchanger is configured to indirectly heat the brewing ingredients contained in the vessel, when the heated liquid is inside the second heat exchanger;
4) the proofing switch is configured to deactivate the burner when pressure in the flue hood rises above a predetermined limit; and
5) the three-way valve is configured to selectively:
   a. close the fluid loop such that the liquid flows from the first heat exchanger to the second heat exchanger via the feed hose and the liquid flows from the second heat exchanger to the first heat exchanger via the return hose, when the three-way valve is in a first position; or
   b. stop the flow of the liquid from the first heat exchanger and the second heat exchanger via the feed hose and to stop the flow of the liquid from the second heat exchanger to the first heat exchanger via the return hose and open a fluid-out line such that the liquid flows from the system via a drain, when the three-way valve is in a second position.

14. The system for brewing beer of claim 13, wherein the burner is configured to be activated only when the fluid loop is closed.

15. The system for brewing beer of claim 13, further comprising:
(a) a direct spark igniter; and
(b) a gas valve;
wherein the gas valve is configured to open and the direct spark igniter is configured to ignite gas when the three-way switch is in the first position.

16. A system for brewing beer, the system comprising:
(a) a first heat exchanger;
(b) a burner;
(c) a second heat exchanger;
(d) a vessel configured to contain brewing ingredients;
(e) a fluid loop comprising the first heat exchanger in fluid communication with the second heat exchanger via a feed hose and the second heat exchanger in fluid communication with the first heat exchanger via a return hose; and
(f) a three-way valve in fluid communication with the feed hose and a drain line;

wherein:
1) the three-way valve is configured to selectively:
   a. close the fluid loop such that a liquid flows from the first heat exchanger to the second heat exchanger via the feed hose and the liquid flows from the second heat exchanger to the first heat exchanger via the return hose, when the three-way valve is in a first position; or
   b. stop a flow of fluid the liquid from the first heat exchanger and the second heat exchanger via the feed hose and to stop a flow of fluid the liquid from the second heat exchanger to the first heat exchanger via the return hose and open a fluid-out line such that the liquid flows from the system via a drain, when the three-way valve is in a second position;
2) the burner once activated is configured to heat the liquid in the first heat exchanger;
3) the first heat exchanger is in fluid communication with the second heat exchanger such that the heated liquid may be transferred from the first heat exchanger to the second heat exchanger; and
4) the second heat exchanger is configured to indirectly heat the brewing ingredients contained in the vessel, when the heated liquid is inside the second heat exchanger.

17. The system for brewing beer of claim 16, further comprising a thermometer configured to measure a temperature of the liquid in the first heat exchanger, and wherein the burner is further configured to de-activate in response to a preselected temperature measured by the thermometer.

18. The system for brewing beer of claim 16, further comprising:
(a) a proofing switch; and
(b) a flue hood;
wherein the proofing switch is configured to deactivate the burner when pressure in the flue hood rises above a predetermined limit.

* * * * *